United States Patent

Moran, Jr. et al.

[11] 4,215,787
[45] Aug. 5, 1980

[54] ELECTRICAL WALL BOX

[75] Inventors: Thomas F. Moran, Jr., Aurora, Ohio;
Ivan L. Volgyesy, Camanche, Iowa

[73] Assignee: Indian Head Inc., New York, N.Y.

[21] Appl. No.: 528,007

[22] Filed: Nov. 29, 1974

[51] Int. Cl.$^3$ .............................................. H02G 3/08
[52] U.S. Cl. ........................................ 220/3.6; 85/36;
151/41.75; 174/54; 174/58
[58] Field of Search ............... 220/3.2, 3.3, 3.4, 3.5,
220/3.6, 3.8, 3.9; 174/52 R, 53, 54, 55, 58, 56;
248/27, DIG. 6; 85/36; 151/41.73, 41.75

[56] References Cited
U.S. PATENT DOCUMENTS

| | | | |
|---|---|---|---|
| 2,804,116 | 8/1957 | Van Niel et al. | 220/3.8 X |
| 2,870,931 | 1/1959 | Buckels | 220/3.6 |
| 3,007,599 | 11/1961 | Greasley | 220/3.6 X |
| 3,340,349 | 9/1967 | Zernes | 174/53 |
| 3,378,160 | 4/1968 | Bassani | 174/58 X |
| 3,575,313 | 4/1971 | Trachtenberg et al. | 174/58 X |
| 3,659,037 | 4/1972 | MacDonald | 220/3.6 X |
| 3,710,972 | 1/1973 | Barry | 220/3.6 |
| 3,770,872 | 11/1973 | Brown | 174/53 |
| 3,848,764 | 11/1974 | Salg | 220/3.6 |
| 3,876,821 | 4/1975 | Pringle | 220/3.2 X |
| 3,891,113 | 6/1975 | Salg | 220/3.6 |
| 3,952,475 | 4/1976 | Paskert | 220/3.4 X |

Primary Examiner—William Price
Assistant Examiner—Stephen Marcus
Attorney, Agent, or Firm—William R. Laney

[57] ABSTRACT

An electrical switch or receptacle box for mounting in a wall, ceiling or the like, including a pair of opposite side walls having retaining studs of triangular or wedge-shaped configuration molded integrally therewith, and terminating rearwardly from the open forward side of the box. The box further includes a pair of integrally molded cover plate flanges which flank the opening at the forward side of the box. Each of the flanges carries a metal insert-receiving lug on the rear side thereof, and each of these lugs is slotted to engage an apertured metal insert which is positioned to receive through an aperture therein, a mounting screw extended through the respective flange and used to mount a cover plate carrying a switch or electrical receptacle on the box.

18 Claims, 6 Drawing Figures

ELECTRICAL WALL BOX

BACKGROUND OF THE INVENTION

1. Field of the Invention

This invention relates to electrical outlet boxes of the types mounted in walls, ceilings or the like to receive the ends of electrical conductors, and act as a point of mounting of a switch or electrical receptacle providing ready access to electrical service.

2. Brief Description of the Prior Art

Many types of electrical switch and receptacle boxes adapted to be mounted in walls, ceilings or the like have been previously proposed. Generally, such boxes are of circular or right parallelepiped configuration and are mounted through a hole formed in the wall and dimensioned to fit closely about the side walls of the box. When so installed, the boxes have an exposed open forward face over which a plate carrying an electrical switch or receptacle can be mounted. Various devices and structure have been used for securely mounting the box in the wall. These generally entail extension of some type of long screws or bolts through parts of the wall into the switch box, or the use of straps extending behind the box and secured to the wall. In many cases, fastening members employed for this purpose have exposed heads or other unsightly portions which project to the surface of the wall and are visible. Other types of boxes involve the use of structure which is time consuming to place in position, and adequately secure to the wall.

In securing the switch or receptacle carrying cover plate to the hollow boxes thus mounted in the wall, it has been a frequent and substantially conventional practice to utilize elongated screws which are extended through portions of the cover plate and fiber washers carried thereby, and into aligned holes formed in portions of the box for receiving the screws. This generally entails a full seating of the screw from the time contact is initially made with the aperture formed for receiving the screw and located in the boxes, until the screw has been turned to its limit of movement through the aperture.

BRIEF DESCRIPTION OF THE PRESENT INVENTION

The present invention provides an improved switch or receptacle box for use in providing an enclosed terminal for non-metallic sheathed cable, which box can be quickly and easily mounted in a flat surface, such as a wall or ceiling, in a way which does not present unsightly exposed screw or bolt heads at the surface of the wall, does not entail the use of straps or other structures which are time consuming to install and tighten in order to secure the box in the wall, and allows the box to simply be snapped in position through the use of a pair of wedge-shaped protuberances carried on the side of the box. Further, the box of the invention greatly expedites the procedure of securing the face or cover plate carrying the switch or receptacle over the open front side of the box after it has been mounted in the wall, since the necessity for fully seating screws or other fastening members is obviated by the unique construction of the box. Moreover, the metal insert elements utilized in the box construction for engaging the plate mounting screws function in a unique way to tenaciously engage such screws.

Broadly described, the box of the invention includes a back wall, a plurality of side walls and an open front side disposed opposite the back wall. Secured to a pair of the side walls which are disposed opposite each other on the box are a pair of wedge-shaped or triangular studs or ribs which present an abutment surface at their terminus which is located rearwardly from the exposed open front side of the box. One embodiment of the box further includes a pair of cover plate flanges which flank the opening at the forward side of the box and carry, in each instance, a metal insert-receiving lug on the rear side of the respective flange. Each of these lugs engages an apertured spring metal insert which is positioned to receive through the aperture therein, a mounting screw extending through the respective flange and used for securing a cover plate on the box. The screw receiving aperture in the metal insert is positioned in a plane which extends at an acute angle to the axis of the screw so that, when the screw is extended through this aperture, the metal insert binds against the screw shank.

From the foregoing description of the invention, it will be apparent that the present invention provides a switch or receptacle box for mounting in a hollow wall, ceiling or the like in an expeditions manner requiring a minimum of adjustment or manipulation of structure to effect such installation, and facilitating, when installed, the rapid and relatively simple mounting of a cover plate across the open front side of the box.

A further object of the invention is to provide an integrally molded, synthetic resin switch or receptacle box for mounting in walls or ceilings, which box can be snapped into position due to its inherent resiliency, and then remain in a securely mounted position in the wall by the inherent resiliency and geometric shape of the box.

An additional object of the invention is to provide a switch or receptacle box which can be mounted quickly and easily in a wall or ceiling, and which enables a cover plate carrying the switch or receptacle to be secured across the open front side of the box with a minimum amount of physical manipulation of screws or other fastening devices to effect such securement.

Additional objects and advantages of the present invention will become apparent as the following detailed description of one embodiment of the invention is read in conjunction with the accompanying drawing which illustrates the invention.

DETAILED DESCRIPTION OF AN EXEMPLARY EMBODIMENT OF THE INVENTION

Figure 1:
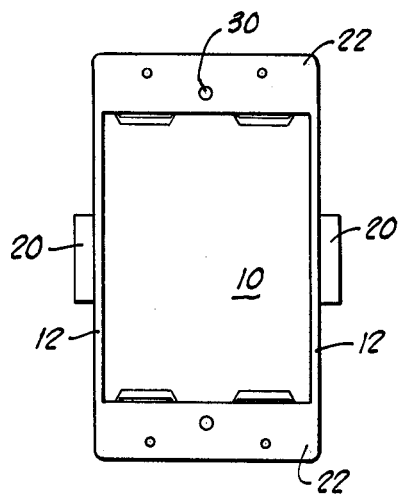
FIG. 1 is a front elevation view of a switch or receptacle box constructed in accordance with the present invention.

One form of switch box constructed in accordance with the principles of the present invention is illustrated in the drawings. The switch box includes a back wall 10, a pair of opposed, substantially parallel side walls 12 and a top wall 14 which lies opposite, and extends parallel to, a substantially identically configured bottom wall. The overall configuration of the box may be described as that of an open-sided, right parallelepiped and, in a preferred construction, the box is an integrally molded unit formed of a suitable synthetic resin material, such as polyvinyl chloride, having certain spring metal inserts operatively associated therewith in the manner hereinafter described.

Formed upon each of the opposite side walls 12 are retaining means which are wedge-shaped, or triangular in cross-section (FIG. 4) with their narrowest portion toward the back wall 10. In the illustrated embodiment of the invention, the retaining means comprises ribs 16 which taper from a relatively thick portion at the front end thereof to a relatively thin portion at the rear end thereof. Further, in the embodiment of the invention here illustrated, the ribs 16 are interconnected by a transverse web portion 18 which extends substantially parallel to the plane of the open forward side of the box, and which has an abutment surface 20 which is spaced rearwardly from the front or forward side of the box a distance approximately equal to the thickness of the surface or wall into which the box is being mounted. It will be perceived that such an abutment surface 20 could be afforded by one or more individual wedge-shaped ribs terminating in such surface, and that the illustrated embodiment represents but one of several forms in which the principle of the invention of providing such an abutment surface can be embodied. For example, the retaining means could be triagular in side elevation instead of trapezoidal as shown, with the abutment surface 20 forming the base of the triangle and, in effect, the head of the wedge. The apex and narrowest portion of the triangle would be toward the back wall 10.

Adjacent the open forward face of the box are a pair of flanges 22 which extend in opposite directions from the opening into the box, and lie in a common plane which coincides with the plane of the opening into the box. The flanges 22 are molded integrally with the remainder of the box, and each further includes an integrally molded, rearwardly projecting lug 24 which is formed at about the center of the respective flange, and extends rearwardly therefrom adjacent the top (or bottom) wall of the box. The construction of each of the lugs 24 can best be perceived by referring to FIGS. 2–4 of the drawings. It will be seen that each lug 24 is generally trapezoidally shaped in side elevation with the longest of the parallel sides of the trapezoid lying in substantially the same plane as the plane of the open front side of the box. Each lug is provided with a slot 26 extending from front to rear in the thickest portion of the stud (see FIG. 3), and an intersecting slot 28 which extends normal to the slot 26, so that the two slots 26 and 28 together form a T-shaped slot in the thickest portion of each of the lugs 24. There is further provided through the tapered portion of each lug 24, a screw passageway 30 which opens through the respective flange 22 as shown in FIG. 1. The axis of the bore of this screw passageway extends normal to the flanges 22, the plane of the open front face of the box and the longest of the parallel sides of the trapezoidally shaped lug 24.

Figure 5:
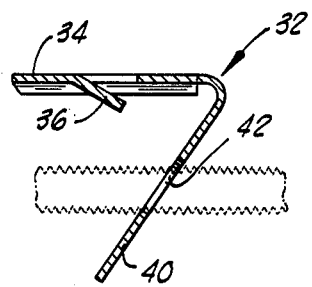
FIG. 5 is a sectional view taken through the center of one of the spring metal inserts utilized in the switch box of the invention, and illustrating, in phantom, a screw engaged by the metal insert.
Figure 6:
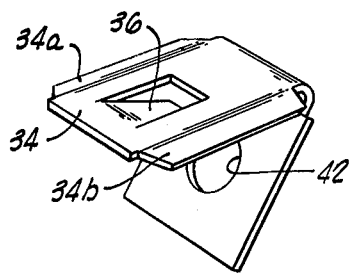
FIG. 6 is a perspective view of the spring metal insert constituting a structural element of the box of the invention.

The slotted lugs 24 as thus constructed receive a spring metal insert constructed of a spring metal material, and illustrated in enlarged form in FIGS. 5 and 6 of the drawings. Each metal insert, designated generally by reference numeral 32, is of generally V-shaped configuration, and thus includes a leg 34 having a lug engaging tongue 36 pressed out of the plane of this leg, and having a pair of opposite side edge portions 34a and 34b which are bent downwardly to impart a generally concave configuration to the leg 34. The leg 34 is connected to a second leg 40 of the metal insert through a bend which defines an actue angle of from about 35° to about 55°. The leg 40 of the metal insert has a relatively large round aperture 42 formed in the center thereof, and extends parallel to a side of the respective lug 24.

Figure 2:
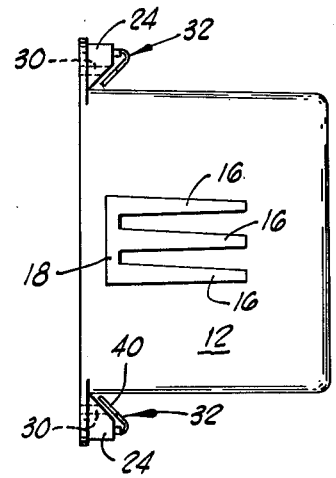
FIG. 2 is a side elevation view of the box depicted in FIG. 1.
Figure 3:
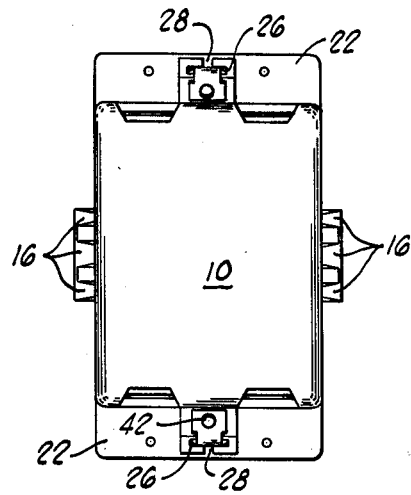
FIG. 3 is a rear elevation view of the box shown in FIGS. 1 and 2.
Figure 4:
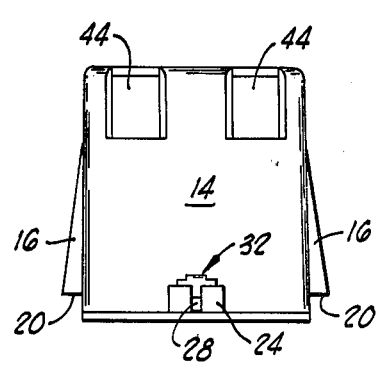
FIG. 4 is a top plan view of the box of the invention.

In the construction of the switch or receptacle box of the invention, one of the spring metal inserts 32 is pressed into and received by each of the lugs 24. The cooperation between the lug 24 and the metal insert 32 is illustrated in FIGS. 2–4 of the drawings. Here it will be perceived that the leg 34 of the respective metal insert 32 is pressed into the transverse slot 26 in the thick portion of the lug 24, and that the leg 40 of the respective metal insert then extends substantially parallel to the tapered side of the respective lug and has its free end spaced from the walls of the box. When the leg 34 of the metal insert is pressed into the slot 26 in the lug, the downwardly bent side edge portions 34a and 34b of the leg 34 are resiliently deformed and are loaded in resilient deformation to provide good frictional engagement between the metal insert and the lug. Moreover, the resilient distortion of the spring metal tongue 36 as the insert is forced into the slot 26 in the lug 24 assures that the tongue will bite into the synthetic resin bounding the slot 26, and that an attempt to pull out the metal insert by forcing it in a direction opposite its direction of insertion will only result in the tongue 36 biting more deeply.

When a metal insert 32 is thus located in one of the lugs 24 in the manner described, the opening 42 formed in the leg 40 is axially aligned with the screw passageway 30 formed through the respective flanges 22, and through the respective lug 24 carrying the insert. This alignment assures that a screw or other fastening device extended through the screw passageway 30 in the flange 22 will pass into the hole 42 formed in the leg 40 of the respective metal insert as hereinafter described with greater particularity. It is important here to note that the hole 42 lies in a plane defined by the insert leg 40, which plane extends at an acute angle to the axis of the screw passageway 30.

The switch or receptacle box is provided with the usual windows 44 which can be easily pried out or removed to enable electrical cable or leads to be extended into the box and secured to contacts or terminals therein, thus providing access via the switch or receptacle carried by a cover plate secured across the open front side of the box after the box is mounted in place. The method of extending the leads or cables into the box through the windows 44, when opened, is conventional practice and well understood by those familiar with this technology.

OPERATION

In the utilization of the switch or receptacle box of the invention, an aperture or opening is first formed through the wall board, sheetrock or other type of finishing material used in the construction of wall, ceiling or the like. The opening thus formed will generally be complementary in size and configuration to the open front side of the box, including the area added to the opening by the flanking flanges 22. When the receiving opening has thus been formed, the box is pressed into the opening until the retaining studs or ribs 16 have passed through the opening, and the web 18 which connects these studs has snapped behind the sheetrock or the like so that the abutment surface 20 of each of these webs on the opposite side walls 12 of the box has come to rest against or abut the back or inner side of the sheetrock or the like. In forcing the box to this position through the opening formed in the wall, the resiliency of the side walls 12 permit these walls to be sprung toward each other a sufficient distance to permit the ribs or studs 16 to pass through the opening. The walls 12 later spring back to their illustrated positions, at which time the abutment surfaces 20 are disposed behind the finishing surface member of the wall, and the box is therefore snapped and locked securely into place.

After mounting of the box in the wall has been accomplished in the manner described, the electrician then has only to place the cover plate (not shown) carrying a switch or receptacle in position across the open front side of the box. To accomplish this, the plate is placed in position with the usual or conventional holes formed through the side portions thereof aligned with the screw passageways 30 through the flanges 22. Appropriate mounting screws are then extended through the holes in the plate and the screw passageways 30 in the flanges 22 until the points of the screws pass into and partially through the openings 42 formed in the legs 40 of the metal inserts. As the screws are pushed inwardly with the threads thereof in contact with the metal surrounding the opening 42 in the metal inserts, the thread of the mounting screw "ratchets" the leg 40 of the metal insert, which is free to move in a downward direction as the pitch and valley of succeeding courses of thread pass through the hole 42. The angulation of the leg 40 with respect to the axis of the screw (shown in phantom in FIG. 5) causes the leg to bind against two different pitches of the screw thread, and the binding force becomes greater as the angle between the plane of the leg 40 and the axis of the screw becomes shallower, as where the screw is moved in a withdrawal direction.

Once the screw has been inserted fully into the metal insert by screwing it the last few turns, it is retained in a fastened status, since the leg 40 of the insert is constrained against movement toward the open side of the box by contact with the tapered rear side of the trapezoidally shaped insert receiving lug 24, and also as a result of the binding force described. The described arrangement has the advantage of facilitating rapid installation of the switch or receptacle carrying plate on the box by mere pressure on the heads of the mounting screws, using a screwdriver only for the final few turns of the screw used to tighten the screw. The screws can be easily removed at any time by turning them in a counterclockwise direction with a screwdriver.

From the foregoing description of the invention, it will ba apparent that this invention provides an improved, easily installed and easily utilized switch or receptacle box. Moreover, a significant saving in the time required to mount and install the cover plate across the open front side of such box is realized as a result of the use of the quick connect spring metal inserts as a portion of the box construction. Moreover, the described ratchet action cooperation between the plate mounting screws and metal inserts enables retention of the screws in a holding status to be realized even after manual insertion, and prior to final securement with a screwdriver. Assembly of the box to its final form ready for usage is simple, since the entire box can be integrally molded, and the metal inserts quickly snapped into position without the requirement for sophisticated tooling for such manufacturing procedure.

Although one box embodiment has been herein described and is illustrated in the drawing for the purpose of exemplifying the way in which the principles which underlie the invention are utilized in one tangible or physical form, it will be understood that various changes and innovations in the precisely illustrated structure may be effected without departure from the basic principles which underlie the invention. For example, some forms of boxes will not utilize the flanges 22, but will instead merely have suitable lugs for receiving the metal inserts formed along the inside boundary of the open front face of the box. Other boxes may have only the lug-spring metal insert feature of the invention, without the inclusion of the wedge-shaped studs or ribs on opposite sides of the box. Changes and innovations of this type are therefore deemed to be circumscribed by the present invention, except as the same may be necessarily limited by the appended claims or reasonable equivalents thereof.

What is claimed is:

1. An electrical wall box comprising:
   a plurality of walls defining a hollow enclosure having an open side;
   a pair of slotted lugs adjacent the open side of the enclosure and disposed on opposite sides thereof, and each having a passageway extending therethrough for receiving a fastening element; and
   generally V-shaped spring metal inserts each having a first leg pressed into the slot of a respective one of said lugs, and each including a second leg bent through an angle of more than ninety degrees with respect to said first leg to impart the V-shape to said spring metal insert, the second leg of each of the metal inserts extending at an acute angle to the axis of the passageway through the respective lug into which the respective insert is pressed, said second leg surrounding an aperture formed therethrough in alignment with the passageway through the respective lug into which the respective insert is pressed, with the aperture in the leg positioned on the axis of the passageway for receiving a threaded fastener extended through the aperture and along the axis of the passageway.

2. An electrical wall box as defined in claim 1 wherein said walls include a plurality of side walls, and wherein said electrical wall box is further characterized as including a pair of triangular shaped ribs secured to the outer surface of said side walls on opposite sides of said hollow enclosure, and spaced from the open side of said enclosure, each of said ribs terminating, at its end nearest said open side, in an abutment surface extending parallel to said open face, and each rib tapering through a diminishing thickness in a direction normal to, and away from, said open face.

3. An electrical wall box as defined in claim 1 wherein:
said box has four interconnected side walls and a back wall opposite said open side;
said lugs are connected to two different side walls; and
said passageways each extend substantially parallel to said side walls and normal to the plane of said open side.

4. An electric wall box as defined in claim 1 wherein the second leg of each of said spring metal inserts has a lug-engaging tongue projecting therefrom into one of said lugs.

5. An electrical wall box comprising:
four interconnected side walls and a back wall defining a hollow enclosure having an open side opposite said back wall;
a pair of flanges secured to two opposite side walls and projecting normal thereto in substantially the same plane as that occupied by said open side of the enclosure, each of said flanges having a passageway extending therethrough;
a pair of slotted lugs mounted respectively on said pair of flanges and located on the opposite sides of the open side of the enclosure, each of said lugs having a passageway extending therethrough substantially parallel to said side walls and substantially normal to the plane of said open side, said passageways extending through said lugs being aligned and in registry with the passageway through the respective flange upon which the respective lug is mounted; and
a spring metal insert pressed into the slot of each of said lugs, and each including a leg extending at an acute angle to the axis of the passageway through the respective lug into which the insert is pressed, said leg having an aperture therethrough positioned in alignment with the passageway through the respective lug into which the insert is pressed, with the aperture in the leg positioned on the axis of the passageway.

6. An electric wall box as defined in claim 5 wherein each of said clips is generally V-shaped in configuration and includes a second leg extending at an acute angle to said first-mentioned leg, and pressed into the slot in the respective lug.

7. An electric wall box as defined in claim 6 wherein the second leg of each of said spring metal inserts has a lug-engaging tongue projecting therefrom into one of said lugs.

8. An electric wall box as defined in claim 7 wherein each of said lugs is generally trapezoidal in shape having its longest parallel side extending in substantially the same plane as the plane of the open side of said enclosure, and having said passageway extending therethrough in a direction normal to the plane of said open side;
and wherein the aperture-carrying leg of each of said clips extends substantially parallel to one of the non-parallel sides of the respective lug into which the respective clip is pressed, and is spaced therefrom.

9. An electric wall box as defined in claim 5 and further characterized as including a pair of triangular shaped ribs secured to the outer surface of two of said side walls on opposite sides of said hollow enclosure, and spaced from the open side of said enclosure, each of said ribs terminating, at its end nearest said open side, in an abutment surface extending parallel to said open side, and each rib tapering through a diminishing thickness in a direction normal to, and away from, said open side.

10. An electric wall box as defined in claim 5 wherein each of said lugs is of generally trapezoidal cross-section having its longest parallel side extending in substantially the same plane as the plane of the open side of said enclosure, and having said passageway extending therethrough in a direction normal to the plane of said open side;
and wherein the aperture-carrying leg of each of said clips extends substantially parallel to one of the non-parallel sides of the respective lug into which the respective clip is pressed, and is spaced therefrom.

11. An electrical wall box comprising:
wall means defining a hollow enclosure open at one side;
a first lug mounted on said wall means adjacent the opening to said enclosure and having a slot therein and having a fastener-receiving passageway extending therethrough;
a second lug mounted on said wall means adjacent the opening to said enclosure and spaced from said first lug, said second lug having a slot therein and having a fastener-receiving passageway extending therethrough;
a first generally V-shaped spring metal insert having a first leg in the slot of said first lug and a second leg bent through an angle of more than 90° with respect to said first leg at a point of joinder with said first leg and extending at an acute angle to the first leg and with respect to the axis of the fastener-receiving passageway extending through said first lug;
a second generally V-shaped spring metal insert having a first leg in the slot of said second lug and a second leg bent through an angle of more than 90° with respect to said first leg at a point of joinder with said first leg and extending at an acute angle to said first leg and with respect to the axis of the fastener-receiving passageway extending through said second lug, said second leg of the second spring metal insert having an aperture therethrough in alignment with the axis of the fastener-receiving passageway extending through said second lug; and
a lug-engaging tongue projecting from the first leg of each of said first and second generally V-shaped spring metal inserts, said lug-engaging tongue projecting in the direction of said second leg and impaling the portion of the respective first and second lugs in which the respective first and second spring metal inserts are mounted.

12. An electric wall box as defined in claim 11 and further characterized as including webs projecting from said wall means on opposite sides of the enclosure, and each having an abutment surface spaced from said open side.

13. An electrical wall box comprising:
a back wall;
side walls means connected to said back wall and projecting therefrom to form, with said back wall, a hollow enclosure having an open side at the edge of said side wall means opposite the edge thereof intersecting said back wall, with said open side extending substantially parallel to said back wall, said side wall means including an defining at least one slot for receiving a fastening element and at least one fastener receiving passageway extending substantially parallel to said slot; and a spring metal insert having a first leg pressed into said slot, and a second leg connected to and extending from said first portion across said passageway, said second leg having an aperture therethrough positioned in alignment with the passageway, with the portion of said second leg defining one side of said aperture being disposed in axially offset position along said passageway with respect to the portion of said second leg defining the side of said aperture opposite said one side thereof, whereby a screw positioned in said passageway with the threaded shank thereof extending through said aperture is engaged by the first and second portions of said second leg at two axially spaced points along the thread on said screw.

14. An electrical wall box as defined in claim 13 wherein said spring metal insert is of generally V-shaped configuration with said first leg and said second leg extending at an acute angle with respect to each other.

15. An electrical wall box as defined in claim 13 wherein said first leg is characterized in having a tongue projecting therefrom and loaded in resilient deformation to resiliently bear against said side wall means and frictionally retain said spring metal insert in said slot.

16. An electrical wall box comprising:
a plurality of walls defining a hollow enclosure having an open side;
a pair of slotted lugs adjacent the open side of the enclosure and disposed on opposite sides thereof, and each having a passageway extending therethrough for receiving a fastener element, each of said lugs being of generally trapezoidal cross-section and having its longest parallel side extending in substantially the same plane as the plane of the open side of said enclosure, and further having said passageway extending therethrough in a direction normal to the plane of said longest parallel side; and
a spring metal insert pressed into the slot of each of said lugs, and each including a leg extending at an acute angle to the axis of the passageway through the respective lug into which the insert is pressed, said leg extending substantially parallel to one of the non-parallel sides of the respective lug into which the respective clip is pressed, and being spaced therefrom, said leg having an aperture therethrough positioned in alignment with the passageway through the respective lug into which the respective insert is pressed, with the aperture in the leg positioned on the axis of the passageway.

17. Means for joining a cover plate to a housing comprising:
A. a plurality of screws;
B. a plurality of clearance holes formed through said cover plate for receiving said screws;
C. a plurality of bosses disposed at the periphery of said housing registering with said cover plate clearance holes and having clearance bores formed therethrough for receiving said screws, each of said bosses including
 1. an edge surface substantially parallel to the axis of said clearance bores;
 2. a substantially flat top flange surface adjacent said plate;
 3. an inclined bottom surface forming an acute included angle with said edge, and
 4. a substantially rectangular slot extending upwardly from said bottom surface parallel to the axis of said clearance bore and spaced between said clearance bore and said edge,
D. a plurality of generally V-shaped resilient clips engaging said bosses each of said clips comprising:
 1. a straight side portion adapted to insertably engage said slot and having formed thereon a spring tab exerting a force normal to the axis of said slot, and
 2. a bottom locking position resiliently extending from said side portion and having an aperture sized to accept said screw formed therethrough having a relaxed position wherein said locking portion is disposed in an angular relationship relative to the axis of the clearance bore such that the axis of said aperture describes an acute angle with the axis of the clearance bore; and movable in response to the insertion of said screw through said clearance bore to operatively engage said locking portion thereby allowing the ratcheting passage of said screw to a loaded position wherein the axis of said aperture is more nearly coincident with the axis of said clearance bore, and being further movable in response to tightening engagement of the screw to a locked position intermediate said relaxed and loaded positions wherein the surface of the locking portion adjacent the through bore threadedly engaged the screw.

18. Means for joining a cover plate to a housing comprising:
a plurality of screws;
a plurality of bosses disposed at the periphery of said housing and having clearance bores formed therethrough for receiving said screws, each of said bosses including
 an edge surface substantially parallel to the axis of said clearance bore;
 a substantially flat top surface adjacent said plate;
 an inclined bottom surface forming an acute included angle with said edge, and
 a substantially rectangular slot extending upward from said bottom surface parallel to the axis of said clearance bore and spaced between said clearance bore and said edge,
a plurality of generally V-shaped resilient clips engaging said bosses, each of said clips comprising:
 a straight side portion adapted to insertably engage said slot and having formed thereon a spring tab exerting a force normal to the axis of said slot, and
 a bottom locking portion resilient extending from said side portion and having an aperture sized to accept said screw formed therethrough having a relaxed position wherein said locking position is disposed in an angular relationship relative to the axis of the clearance bore such that the axis of such aperture describes an acute angle with the axis of the clearance bore; and movable in response to the insertion of said screw through said clearance bore to operatively engage said locking portion thereby allowing the ratcheting passage of said screw to a loaded position wherein the axis of said aperture is more nearly coincident with the axis of said clearance bore, and being further movable in response to tightening engagement of the screw to a locked position intermediate said relaxed and loaded positions wherein the surfaces of the locking portion adjacent the through bore threadedly engaged with the screw.

* * * * *

UNITED STATES PATENT AND TRADEMARK OFFICE
CERTIFICATE OF CORRECTION

PATENT NO. : 4,215,787
DATED : August 5, 1980
INVENTOR(S) : Thomas F. Moran, Jr. and Ivan L. Volgyesy It is certified that error appears in the above—identified patent and that said Letters Patent is hereby corrected as shown below:

Section [73], Assignee, should read:

--Thomas F. Moran, Jr. none
  Ivan L. Volgyesy, part interest to Indian Head, Inc.
            New York, N. Y.--.

Signed and Sealed this

Twenty-first Day of September 1982

[SEAL]

Attest:

GERALD J. MOSSINGHOFF

*Attesting Officer*  *Commissioner of Patents and Trademarks*